United States Patent Office

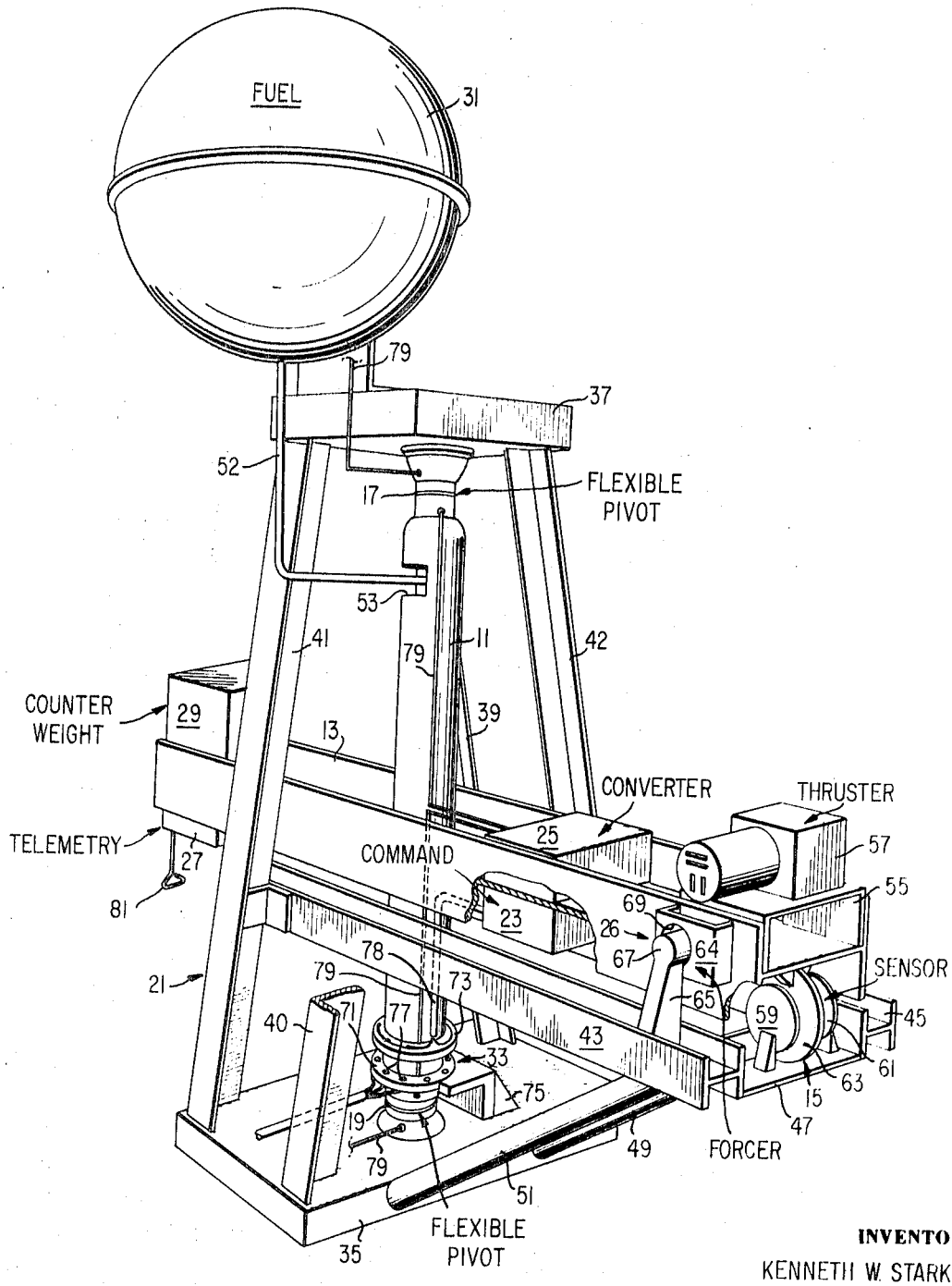

3,572,104
Patented Mar. 23, 1971

3,572,104
MICRO-POUND EXTENDED RANGE THRUST STAND
Kenneth W. Stark, Hyattsville, Md., assignor to the United States of America as represented by the Administrator of the National Aeronautics and Space Administration
Filed May 29, 1969, Ser. No. 828,909
Int. Cl. G01l 5/00
U.S. Cl. 73—117.4    12 Claims

ABSTRACT OF THE DISCLOSURE

This disclosure describes a micro-pound extended range thrust stand comprising a vertical tubular member rotatably held at both ends by flexible pivots. A horizontal support beam is attached to the tubular member and supports a thruster package at one end. A counter weight is mounted on the other end of the support beam to balance the weight of the thruster package. A sensor is provided for sensing the movement of the beam caused by low level thrusts. And, a magnetic forcer is provided for counteracting higher level thrusts so that a null balance system is provided for testing higher level thrusts. Suitable electronic means are provided for controlling the operation of the thruster and for telemetering data from the sensor and other measuring devices.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

A thruster is a small rocket engine generally used on a space vehicle to vary the attitude of the vehicle or to change the orbital position of the vehicle. Various types of devices have been developed for measuring the amount of thrust developed by various types of thrusters. In general, these systems comprise thrust stands with means to detect the amount of force generated by a particular thruster. In most cases, prior art thrust stands have been designed to meet the limited immediate requirements of a particular thruster and as such exhibit many disadvantages. More specifically, prior art thrust stands exhibit at least one and, more often, more than one of the following disadvantages: (1) a restricted thrust measuring range; (2) a sensitivity to environmental building inputs such as vibration; (3) an unstable platform due to the type of suspension system used; (4) an inability to support a complete thruster flight package; (5) a table that is difficult to balance; (6) inaccurate measurements due to the introduction of frictional losses; and (7) a requirement for elaborate and time consuming calibration.

It can be seen from the foregoing disadvantages that it is desirable to provide a thrust stand which is generally universal in nature and operates over a relatively wide thrust range. In addition, the thrust stand must be suitable for use in a vacuum chamber, since it is desirable to test thrusters in a vacuum chamber due to their ultimate use on a space vehicle which will be in a vacuum. Moreover, the stand must be relatively uncomplicated to use, and accurate.

Therefore, it is an object of this invention to provide a new and improved thrust stand for use in testing thrust packages.

It is a further object of this invention to provide a thrust stand suitable for use with thrust packages which generate thrust force over a relatively wide range.

It is another object of this invention to provide a micro-pound extended range thrust stand that has low frictional losses, is insensitive to environmental vibrations, requires only minor changes and modifications when moving from one thrust range to another thrust range, has a stable platform, and is easily calibrated.

SUMMARY OF THE INVENTION

In accordance with a principle of this invention a micro-pound extended range thrust stand is provided. The thrust stand comprises a vertical tubular member rotatably held at both ends by flexible pivots. A horizontal support beam is attached to the tubular member and supports a thrust package at one end. Suitable means are provided for balancing the vertical support beam when a thruster is mounted thereon and a sensor is provided for sensing movement of the beam caused by the operation of the thrust package.

In accordance with another principle of this invention, a magnetic forcer is provided to counteract the thrust generated by the thrust package. In this manner, a null balance system is provided.

In accordance with a further principle of this invention, electronic means are mounted on the horizontal support beam so as to control the operation of the thruster and for telemetering information sensed by the sensor and other measuring devices. In addition, frictionless transfer means are provided for applying control signals to the electronic means.

It will be appreciated from the foregoing summary of the invention that an extended range thrust stand is provided. The range of the thrust stand is from one to fifty thousand micro-pounds, or greater. Because the invention utilizes flexible pivots, friction generated errors are essentially eliminated. Friction errors are also reduced because a frictionless means for applying control signals to the thruster and other elements is provided. In addition, because the sensor can operate either as a movement sensor or as a null balance sensor, the range over which the thrust stand can be utilized is greately increased. Moreover, because the null mode of operation includes a magnetic forcer, the system is inherently damped, thereby reducing or eliminating the effects of external vibrations. In all modes of operation a permanent magnet is used to provide a fixed level of eddy damping.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawing, wherein a pictorial illustration of a preferred embodiment of the invention is illustrated.

DESCRIPTION OF THE PREFERRED EMBODIMENT

The preferred embodiment of the invention illustrated in the drawing comprises: a hollow support tube 11; a support beam 13; a sensor 15; an upper flexible pivot 17; a lower flexible pivot 19; a stand 21; command electronics 23; converter electronics 25; a magnetic forcer 26; telemetry electronics 27; a counter weight 29; a fuel tank 31; and, control structure 33.

The frame 21 comprises a horizontal base plate 35 and a horizontal upper plate 37. The upper plate 37 is held generally parallel to the base plate 35 by generally vertical support members 39, 40, 41 and 42. Two horizontal support members 43 and 45 project outwardly in parallel from the generally vertical support members one from each pair of support members. A horizontal cross support member 47 is connected between the outer ends of the horizontal support members 43 and 45. A pair of angle support members 49 and 51 project outwardly and upwardly from the base 35 to the horizontal cross support member 47. The various vertical and horizontal support members may be formed of angle beams, I beams, H beams, or tubular beams as necessary to provide adequate strength for supporting the overall structure.

The upper and lower flexible pivots are assemblies that allow frictionless coupling between elements attached to their outer ends. The upper flexible pivot 17 has one end fixedly attached to the upper plate 37 and the lower flexible pivot 19 has one end fixedly attached to the base plate 35. The hollow support tube 11 is fixedly attached to and between the other sides of the upper and lower flexible pivots 17 and 19. By this manner, of attachment, the hollow support tube 11 is allowed to rotate in a frictionless manner about its longitudinal vertical axis. The fuel tank 31 is attached close to the upper support plate 37 by any suitable means. A flexible fuel line 52 is connected to the fuel tank 31 and passes through a relatively large aperture 53 into the inside of the hollow support tube 11 to supply fuel to a thruster. It will be appreciated by those skilled in the art that the fuel tank 31 may be eliminated if the thrust package being tested has a self contained fuel supply.

The support beam 13 is fixedly attached to the hollow support tube 11 by any suitable means, such as welding, so that it projects between the generally vertical support members 39, 40, 41 and 42, and between and above the horizontal support members 43 and 45. A stand 55 suitable for supporting a thrust package 57 is attached to one end of the support beam 13. The counter weight system 29, illustrated schematically as a block, is mounted on the other end of the support beam 13. The counter weight system 29, preferably, represents two systems. One system consist of a hand operated course balance and the other is a remotely operated counter weight to provide fine or vernier balancing when required.

The support beam is illustrated in the figure as an H beam, however, it can be formed of any structural configuration having sufficient rigidity to perform the desired function of supporting the elements in the manner illustrated .

The command electronics 23 are illustrated as attached to the lower side of the support beam 13. Similarly, the converter electronics 25 are illustrated as attached to the upper side of the support beam 13. The telemetry electronics are illustrated as attached to the lower side of the support beam 13 beneath the counter weight 29. However, it is to be understood that these are merely exemplary locations and that any suitable location for the various electronic systems commensurate with the operation of the invention may be used.

The sensor 15 is a three plate capacitive sensor. The two outer plates 59 and 61 are fixedly attached to the horizontal cross support member 47. The third or inner plate 63 is fixedly attached to the lower side of the support beam 13 between the two outer plates 59 and 61. Hence, as the support beam 13 moves due to the operation of the thruster package 57, the capacitance between the plates varies. As hereinafter described, this variation in capacitance is utilized to measure the strength of the thruster if the thruster is a low level thruster or is used to detect a a null if the thruster is a high level thruster.

The magnetic forcer 26 comprises a ferromagnetic U-shaped element 64 having its legs attached to one side of the support beam 13. A coil support member 65 projects upwardly from one of the horizontal support members 43 and supports a coil 67 that projects through an aperture 69 in the cross member of the U-shaped element 64. When electrical energy is applied to the coil 67 the magnetic flux generated by the coil interacts with the ferromagnetic U-shaped element 64 in a well known manner and tends to maintain the support beam 13 in a fixed position. By increasing the electrical energy the force generated by the interaction increases.

The control structure 33 comprise a lower control structure 71 and an upper control structure 73. The upper control structure is fixedly attached to the hollow tubular member 11 and the lower control structure 71 is fixedly attached to the base plate 35 via a stand 75. The lower control structure 71 includes a plurality of lights 77 that project beams upwardly. The beams have axes that each intersect one of a plurality of photocells (not shown) located in the lower side of the upper control structure 73. The photocells are connected to the command electronics 73. In operation, when the any one or more of the lamps 77 are ignited, they generate a light beam which is detected by a suitable photocell or a number of photocells. The command electronics senses via a cable 78 which photocells are detecting a light beam. In this manner, the command electronics 13 receives commands from a source remote from the environment in which the thrust stand is mounted. The commands are utilized to activate the valves, solenoids, motors, switches etc. necessary for the operation of the thruster 57 and the magnetic forcer 26.

The converter electronics 25 are connected via a cable 79 that passes through the upper and lower flexible pivots 17 and 19 to a power source (not shown). The converter converts the power from the power source to values necessary for the operation of the sensor 15, the photocells 77, the telemetry electronics 27, the command electronics, and any other necessary electronics.

The telemetry electronics receives sensor signals from the sensor 15 and force signals from the magnetic forcer 26, if the forcer is energized, and transmits them via an antenna 81 to a remotely located receiver.

The operation of the thruster stand of the invention is as follows: a thruster package 57 is mounted on the support beam 13 in the manner illustrated in the figure. The center line of the thruster is aligned with a suitable reference line located on the upper surface of the stand 55. The counter weight 29 (both coarse and fine) is then adjusted so that balance is achieved. Balance is determined when the sensor 15 generates a minimum output signal which serves as a null or zero thrust point. Thereafter, if not previously done, the sensor is calibrated by operating the magnetic forcer 26. That is, the forcer is energized so as to create a slight movement of the support beam 13. This movement is sensed by the sensor 15 which generates signals and these signals are calibrated in terms of the precalibration of the magnetic forcer 26.

After calibration of the sensor has been completed, the thruster is energized in the manner determined by the particular thruster being tested. That is, external control signals are applied via the light-photocell control ring system to the command electronics 23. The command electronics energizes the thruster 57 by opening a valve in the fuel line, if necessary; or, by electrically igniting the thruster in some suitable manner, if necessary. Depending upon the level of thrust developed by the thruster 57, the capacitor operates in either a direct readout mode or a null balance mode. That is, if the thruster is a low level thruster, the sensor 15 operates in a direct readout mode so that as the thruster is energized signals are generated by the sensor which are applied via the telemetry electronics 27 and the antenna 81 to a remote receiver. Alternatively, if the thruster 57 is a high level thruster, the magnetic forcer 26 is energized to maintain the sensor in a null position. The amount of electrical energy applied to the magnetic forcer to counteract the thrust provides an indication of the amount of thrust generated by the thruster 57. Preferably, the mode of operation of the sensors and the electronics is controlled externally from a control panel located outside of the vacuum chamber in which the thrust stand is located. In any event, the outputs from the sensor and the magnetic forcer are telemetered to a display and recording arrangement located outside of the vacuum chamber. In addition, if desired, housekeeping data such as vibration, temperature and other environmental factors are monitored and transmitted via the telemetry electronics 27 to the remote receiver.

It will be appreciated from the foregoing description that a micro-pound extended range thrust stand that overcomes the disadvantages of the prior art is provided by the invention. The thrust stand can operate over a wide range of thrust, such as from one to fifty thousand micro-pounds, for example. This range can be extended or reduced by suitably modifying the overall system. However, it will be appreciated by those skilled in the art that this range is sufficient for most thrusters utilized on orbiting space vehicles, such as communication satellites. The invention is structurally capable of supporting thrusters having large weight variations without introducing undue friction because it uses a counter weight to balance the thruster. Further, because the structure is relatively, rigid, a system having high natural frequency is provided. This has the effect of attenuating the low frequency building inputs to the ssytem thus minimizing perturbating effects on thrust readings and accuracy. In addition, because the capacitor sensor senses horizontal motion of the support beam which is 90 degrees from the vertical environmental perturbation inputs, readout sensitivity and accuracy are increased. Moreover, by the use of flexural pivots a rugged system is provided that is relatively frictionless thereby improving accuracy. And, because remote fine balancing can be provided, the thrust stand can be finely balanced even after the vacuum chamber in which it is located has been pumped down without requiring system shut down. Fnally, the use of a pre-calibrated magnetic forcer provides system damping and remote calibration. Hence, the invention has numerous advantages not provided by the prior art.

It will be appreciated by those skilled in the art and others that only a preferred embodiment of the invention has been illustrated and described, and that various changes can be made without departing from the scope of the invention. For example, the structural support beams can be formed of specific types other than the I, H and tubular beams illustrated in the figure. Moreover, the counter weight system may be of any type of various types. Finally, if desired, a sensor other than capacitive sensor can be utilized by the invention. Consequently, the invention can be practiced other than as specifically described herein.

What is claimed is:

1. A micro-pound extended range thrust stand comprising:
   a stand having an upper plate and a lower plate;
   a first flexible pivot attached to said upper plate;
   a second flexible pivot attached to said lower plate;
   a vertical member held between said first and second flexible pivots;
   a horizontal support beam fixedly attached to said vertical member for supporting a thruster;
   a plurality of generally vertical members for supporting said upper plate above said lower plate and a pair of horizontal support members extending beneath said horizontal support beam, said horizontal support members having their ends closed by an end suport member; and,
   a sensor mounted so as to sense the movement of said horizontal support beam.

2. A micro-pound extended range thrust stand as claimed in claim 1, including a magnetic forcer mounted so as to counteract the force generated by said thruster.

3. A micro-pound extended range thrust stand as claimed in claim 2, wherein said thruster is mounted on one end of said horizontal suport beam; and, including a counter weight system mounted on the other end of said horizontal support beam so as to balance the weight of said thruster, 4. A micro-pound extended range thrust stand as claimed in claim 3, including command electronics adapted to receive command signals and connected so as to control the operation of said thruster and said magnetic forcer.

5. A micro-pound extended range thrust stand as claimed in claim 4, including transfer means for frictionlessly applying command signals to said command electronics.

6. A micro-pound extended range thrust stand as claimed in claim 5, wherein said transfer comprises:
   a first structure including a plurality of lamps fixedly attached to said stand; and,
   a second structure including a plurality of photocells, fixedly attached to said vertical member, said photocells being aligned with the light beams generated by said lamps.

7. A micro-pound extended range thrust stand as claimed in claim 6, wherein said vertical member is a tubular cylinder.

8. A micro-pound extended range thrust stand as claimed in claim 7, wherein said sensor is a capacitor sensor formed of three plates, two of said plates being attached to said end member in a parallel arrangement and said third plate being attached to said horizontal support beam between said first and second plates and in parallel with said first and second plates.

9. The micro-pound extended range thrust stand as claimed in claim 8, including telemetry electronics connected to said sensor and to said forcer for telemetering information derived from said sensor and said forcer to a remote location.

10. A micro-pound extended range thrust stand as claimed in claim 9, including converter electronics adapted to receive electrical energy from an external source and for converting said energy to voltage levels suitable for operating the magnetic forcer, the command electronics, the sensor and the telemetry electronics.

11. A micro-pound extended range thrust stand as claimed in claim 1, wherein said sensor is a capacitor sensor formed of three plates, two of said plates being attached to said end member in a parallel arrangement and said third plate being attached to said horizontal support beam between said first and second plates and in parallel with said first and second plates.

12. A micro-pound extended range thrust stand as claimed in claim 11, wherein said thruster is mounted on one end of said horizontal support beam; and, including a counter weight system mounted on the other end of said horizontal support beam so as to balance the weight of said thruster.

References Cited

UNITED STATES PATENTS 3,313,148   4/1967   Dautreppe et al. _____ 73—99
3,508,437   4/1970   Von Beck _____ 73—99X JERRY W. MYRACLE, Primary Examiner U.S. Cl. X.R.

73—141